US012316767B2

(12) United States Patent
Wang et al.

(10) Patent No.: US 12,316,767 B2
(45) Date of Patent: *May 27, 2025

(54) PROCESSING OF REQUESTS TO CONTROL INFORMATION STORED AT MULTIPLE SERVERS

(71) Applicant: Google LLC, Mountain View, CA (US)

(72) Inventors: Gang Wang, Frederick, MD (US); Rock Yuen-Wong, San Francisco, CA (US); Arpana Hosabettu, San Jose, CA (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,236

(22) Filed: Jul. 11, 2024

(65) Prior Publication Data

US 2024/0364524 A1   Oct. 31, 2024

Related U.S. Application Data

(63) Continuation of application No. 17/772,188, filed as application No. PCT/US2020/051990 on Sep. 22, 2020, now Pat. No. 12,074,975.

(30) Foreign Application Priority Data

Aug. 23, 2020   (IL) .......................... 276868

(51) Int. Cl.
*H04L 9/32*   (2006.01)
*H04L 9/08*   (2006.01)
*H04L 9/40*   (2022.01)

(52) U.S. Cl.
CPC .......... *H04L 9/3213* (2013.01); *H04L 9/0869* (2013.01); *H04L 9/3242* (2013.01); *H04L 63/0435* (2013.01); *H04L 63/126* (2013.01)

(58) Field of Classification Search
CPC ... H04L 9/0869; H04L 9/3213; H04L 9/3242; H04L 63/0435; H04L 63/126; H04L 63/205

See application file for complete search history.

(56) References Cited

U.S. PATENT DOCUMENTS 8,775,810 B1    7/2014  Snodgrass et al.
9,230,085 B1 *  1/2016  Paczkowski ............ G06F 21/57
(Continued)

FOREIGN PATENT DOCUMENTS

CN    105659558    6/2016
CN    107005413    8/2017
(Continued)

OTHER PUBLICATIONS

Notice of Allowance in Chinese Appln. No. 202080075420.X, mailed on Sep. 3, 2024, 6 pages (with English translation).
(Continued)

*Primary Examiner* — Eric W Shepperd
(74) *Attorney, Agent, or Firm* — Fish & Richardson P.C.

(57) ABSTRACT

Methods, systems, and apparatus, including computer programs encoded on a computer storage medium, for transmitting/processing requests to control information stored at multiple content platforms/servers. In one aspect, a client device can send a request to verify the device's trustworthiness to a device trustworthiness server. The client device can receive, from the device trustworthiness server, data indicating that the client device is trustworthy, in response to which, the client device can send, to a relay server, a request to control user data stored at a plurality of servers. The client device can receive, via the relay server, a response from each of the plurality of servers. Based on the responses, the client device can determine that at least a subset of the plurality of
(Continued)

servers that included the user data has performed the action specified in the request to control the user data.

20 Claims, 4 Drawing Sheets

(56) References Cited

U.S. PATENT DOCUMENTS

| | | | | |
|---|---|---|---|---|
| 9,792,611 | B2* | 10/2017 | Hammad | G06F 21/34 |
| 12,174,991 | B2* | 12/2024 | Ilincic | H04L 9/0819 |
| 2004/0193919 | A1 | 9/2004 | Dabbish et al. | |
| 2005/0108551 | A1 | 5/2005 | Toomey | |
| 2005/0273607 | A1 | 12/2005 | Yamana et al. | |
| 2008/0170693 | A1 | 7/2008 | Spies et al. | |
| 2009/0037725 | A1 | 2/2009 | Farrugia et al. | |
| 2009/0235339 | A1* | 9/2009 | Mennes | H04L 9/3273 |
| | | | | 726/5 |
| 2013/0308637 | A1 | 11/2013 | Han et al. | |
| 2015/0349965 | A1 | 12/2015 | Mori | |
| 2016/0226907 | A1* | 8/2016 | Weiss | G06F 21/57 |
| 2018/0069836 | A1 | 3/2018 | Mandyam | |
| 2018/0114000 | A1 | 4/2018 | Taylor | |
| 2018/0227290 | A1* | 8/2018 | Yang | H04L 9/3213 |
| 2018/0309756 | A1* | 10/2018 | Chen | G06F 21/41 |
| 2019/0199530 | A1 | 6/2019 | Reitsma et al. | |
| 2020/0007504 | A1 | 1/2020 | Lee | |
| 2020/0076601 | A1 | 3/2020 | Tabrizi | |
| 2021/0150058 | A1 | 5/2021 | Unagami et al. | |
| 2021/0173854 | A1 | 6/2021 | Wilshinsky | |
| 2022/0129578 | A1 | 4/2022 | Kim | |

FOREIGN PATENT DOCUMENTS

| | | |
|---|---|---|
| CN | 108463982 | 8/2018 |
| CN | 111213339 | 5/2020 |
| JP | 2019-192089 | 10/2019 |
| KR | 10-1748627 | 6/2017 |

OTHER PUBLICATIONS

Office Action in Korean Appln. No. 10-2022-7012700, mailed on Oct. 10, 2024, 14 pages (with English translation).
International Preliminary Report on Patentability in International Appln. No. PCT/US2020/051990, mailed on Mar. 9, 2023, 10 pages.
International Search Report and Written Opinion in International Appln. No. PCT/US2020/051990, mailed on May 11, 2021, 17 pages.
Office Action in Chinese Appln. No. 202080075420.X, mailed on Nov. 17, 2023, 20 pages (with English translation).
Office Action in European Appln. No. 20788926.2, mailed on Sep. 14, 2023, 8 pages.
Office Action in Indian Appln. No. 202227020272, mailed on Jul. 27, 2023, 7 pages (with English translation).
Office Action in Israeli Appln. No. 276868, mailed on Feb. 26, 2023, 4 pages.
Office Action in Japanese Appln. No. 2022-525404, mailed on May 22, 2023, 10 pages (with English translation).
Office Action in Japanese Appln. No. 2022-525404, mailed on Oct. 23, 2023, 6 pages (with English translation).
Psacertified.org [online], "Entity Attestation Token White Paper Version: 1 How Service Providers can Trust the Internet of Things," Feb. 18, 2020, retrieved on Apr. 19, 2021, retrieved from URL <https://www.psacertified.org/app/uploads/2020/02/PSA_Certified_Entity_Attestation_Overview_Whitepaper.pdf>, 1-17.
Office Action in Indian Appln. No. 202227020272, mailed on Aug. 7, 2024, 5 pages (with English translation).

* cited by examiner

PROCESSING OF REQUESTS TO CONTROL INFORMATION STORED AT MULTIPLE SERVERS

CROSS-REFERENCE TO RELATED APPLICATIONS

This application is a continuing application of U.S. patent application Ser. No. 17/772,188, filed Apr. 27, 2022, which is a National Stage Application under 35 U.S.C. § 371 and claims the benefit of International Application No. PCT/US2020/051990, filed Sep. 22, 2020, which claims the benefit of Israel Application No. 276868, filed Aug. 23, 2020. The disclosures of the foregoing applications are incorporated herein by reference in their entirety.

BACKGROUND

This specification generally relates to data processing as well as the secure and efficient transmission and processing of requests to control information stored at multiple content platforms/servers.

A user of a client device can request control over the user's information stored at a particular content platform/server. Such a request to control user data can include, e.g., a request to delete all or part of the user's information, a request to modify the user data, a request to access the user data, or a request to prevent transmission of the user data to any other entity. Because the user's information may be stored at multiple different servers, the client device has to generate and transmit a separate request to each such content platform/server.

SUMMARY

In general, one innovative aspect of the subject matter described in this specification can be embodied in methods including the operations of sending, by a client device and to a device trustworthiness server, a request to verify the trustworthiness of the client device; receiving, by the client device and from the device trustworthiness server, data indicating that the client device is trustworthy; in response to receiving the data indicating that the client device is trustworthy, sending, by the client device and to a relay server, a request to control user data stored at a plurality of servers, wherein: the relay server is a server that validates the request to control user data before transmitting the request to control user data to each of the plurality of servers; and the request to control user data specifies an action to be performed by a server with respect to the user data; receiving, by the client device and via the relay server, a response from each of the plurality of servers; and determining, by the client device and based on the responses, that at least a subset of the plurality of servers that included the user data has performed the action specified in the request to control the user data. Other embodiments of this aspect include corresponding methods, apparatus, and computer programs, configured to perform the actions of the methods, encoded on computer storage devices. These and other embodiments can each optionally include one or more of the following features.

In some implementations, methods can further include generating, by the client device, a digital token comprising (1) a device identifier of the client device, (2) the first data parameter, wherein the first data parameter is a timestamp specifying a time at which digital token was created, (3) an instruction specifying a type of action with respect to user data stored at a plurality of servers, and (4) data identifying the plurality of servers; and encrypting, by the client device and using a symmetric encryption algorithm, the digital token to obtain the encrypted digital token.

In some implementations, encrypting, by the client device and using the symmetric encryption algorithm, the digital token to obtain the encrypted digital token can include: generating an encryption key using a cryptographic pseudrandom function and based on data parameters including a current date, a first data string, and the device identifier; and encrypting, by the client device and using the encryption key, the digital token to obtain the encrypted digital token.

In some implementations, generating the encryption key using the cryptographic pseudrandom function and based on data parameters including a current date, a first data string, and the device identifier, can include generating the encryption key by (1) computing a first message authentication code (MAC) using the current date and the first data string, and (2) generating a second MAC using the device identifier and the first MAC.

In some implementations, the request to verify the trustworthiness of the client device can include a first set of data, which can include (1) device trustworthiness data from which a trustworthiness of the client device is determined and (2) a third MAC generated using the encrypted digital token and the first data parameter.

In some implementations, the request to control user data can include a second set of data including (1) the data indicating that the client device is trustworthy, (2) the encrypted digital token, (3) the first data parameter, (4) data identifying the plurality of servers, and (5) a fourth MAC generated using the device identifier, a second data parameter, and a third data parameter.

In some implementations, the second data parameter can include a current date and the third data parameter includes a second data string.

In some implementations, receiving, by the client device and from the device trustworthiness server, data indicating that the client device is trustworthy can include receiving, by the client device and from the device trustworthiness server, a digital signature by the device trustworthiness server over the third MAC.

In some implementations, the action to be performed by the server with respect to the user data can include one of: deleting the user data stored at the server; requesting that the user data stored at the server not be transmitted or provided to any other entity; enabling access to the user data stored at the server to one or more entities; requesting the disclosure of user data collected; or requesting the export of user data collected.

Particular embodiments of the subject matter described in this specification can be implemented to realize one or more of the following advantages.

The techniques described in this specification provide resource efficient techniques for processing a large number of requests to content platforms/servers that store information for the user of the client device. In general, generating and transmitting a large number of requests to various content platforms/servers can consume a large amount of the client device's computing resources (e.g., battery, processor cycles, bandwidth, etc.). The techniques described in this specification can significantly reduce the impact on the client device's computing resources in generating and transmitting such requests, by utilizing a relay server that receives a single request (as opposed to multiple requests)

from the client device and generates and routes multiple requests to multiple content platforms/servers that store the user data.

Moreover, the techniques described in this specification provide security mechanisms that prevent, or at least reduce the likelihood of, attacks on the relay server from being propagated across the network to the various content platforms/servers with which the relay server communicates. For example, a denial of service (DOS) attack may be launched on the relay server, which in turn may be propagated to the various content platforms/servers with which the relay server communicates. As a result, the DOS attack on the relay server may disrupt the operations of the relay server as well as the operations of the various content platforms/servers with which the relay server communicates. To prevent or reduce the spread/propagation of such attacks, the techniques described in this application implement a device trustworthiness server that verifies the trustworthiness of a requesting client device and provides this trustworthiness indication to the relay server, which in turn verifies the trustworthiness of the device before sending any requests/messages to the various content platforms/servers. As a result, when a device is deemed to be untrustworthy or when a device's trustworthiness cannot be verified, the relay server does not submit the request from such a device, which potentially may be a malicious or compromised device.

Further still, the techniques described in this specification shield any user/device information that is provided to the relay server (e.g., identification information that may be used to fulfill the request to control user data stored at the various servers), thus avoiding any intentional or unintentional release/dissemination of such information from/by the relay server. In some implementations, the techniques described herein encrypt the device identifier (and/or other device/user identification information) within an encrypted token and apply other security measures to this token, before transmitting it to the relay server. The techniques used to generate this token (which are described below) prevent the relay server from being able to decipher/decrypt this token, which in turn prevents the relay server from being able to access the device and/or user identification information stored within the token. These protective techniques do not interfere with the operation of the relay server. For example, despite the inaccessibility of the data within this token, the relay server is still able to transmit the request to control user data to the various content platforms/servers. As a result, the techniques described in this specification maintain user/device privacy during the process of requesting control over user data, while enabling the performance/fulfillment of the device's request to control user data at the various servers.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
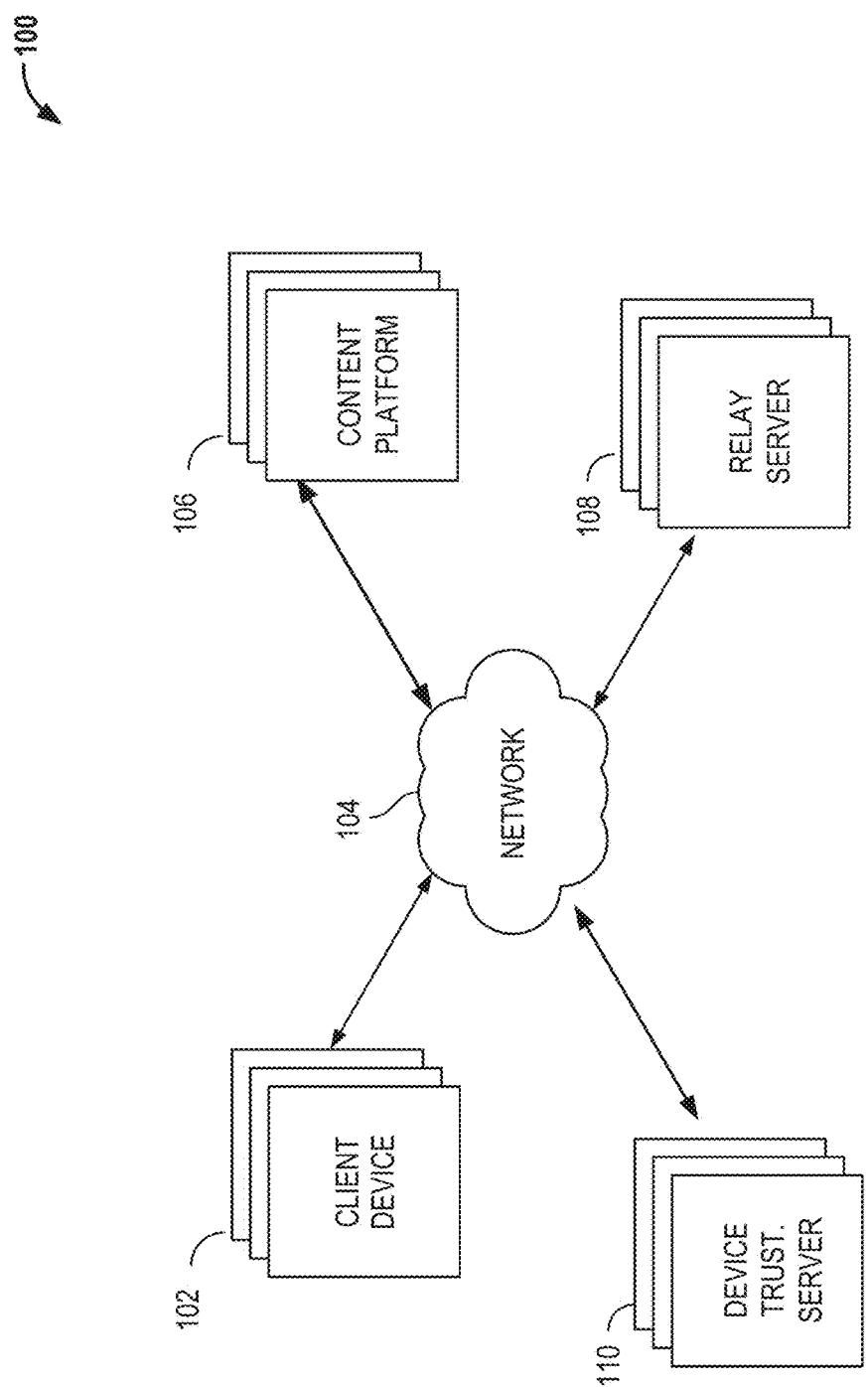
FIG. 1 is a block diagram of an example environment in which digital content is distributed and provided for display on client devices.

This specification generally relates to secure and efficient transmission and processing of a request to control user information, also referred to as user data, stored at multiple content platforms/servers.

As summarized below and described in greater detail throughout this document, a client device operates in conjunction with a relay server and a device trustworthiness server to generate and transmit requests to control user information stored at various servers.

In some implementations, the client device sends a request to verify the trustworthiness of the client device to a device trustworthiness server. This request can include device trustworthiness data that includes a set of signals obtained from the device's environment and from which a trustworthiness of the client device can be determined.

The device trustworthiness server uses the device trustworthiness data included in the request to verify the device's trustworthiness. Based on this verification, the device trustworthiness server sends data indicating whether the client device is trustworthy to the client device.

Upon receiving the data indicating whether the client device is trustworthy from the device trustworthiness server, the client device sends, to a relay server, a request to control user information stored at various servers. The request to control user information specifies an action (e.g., delete user information, modify access rights to the user information, prevent dissemination of the user information) to be performed by a server with respect to the user information and specifies the servers at which the requested action is to be performed. This request also includes the data indicating whether the client device is trustworthy.

Upon receiving the request from the client device, the relay server validates this request upon determining that the device is trustworthy based on the data received from the device trustworthiness server. Once validated, the relay server transmits the request to control user information to the various servers specified in the request from the client device. The servers, upon receiving the request from the relay server, validate the request and perform the appropriate action(s) specified in the request to effect control over the user information.

The servers then send a response to the relay server, specifying whether the server fulfilled the request. The relay server in turn sends these responses to the client device, providing confirmation regarding whether the requests to control user information were fulfilled.

These features and additional features are further described in greater detail below with reference to FIGS. 1-4.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which digital content is distributed and provided for display on client devices.

The example environment 100 includes a network 104. The network 104 can include a local area network (LAN), a wide area network (WAN), the Internet, or a combination thereof. The network 104 can also include any type of wired and/or wireless network, satellite networks, cable networks, Wi-Fi networks, mobile communications networks (e.g., 3G, 4G, and so forth), or any combination thereof. The network 104 can utilize communications protocols, including packet-based and/or datagram-based protocols such as internet protocol (IP), transmission control protocol (TCP), user datagram protocol (UDP), or other types of protocols. The network 104 can further include a number of devices that facilitate network communications and/or form a hardware basis for the networks, such as switches, routers, gateways, access points, firewalls, base stations, repeaters or a combination thereof.

The network 104 connects client devices 102, content platforms 106, device trustworthiness servers 110, and relay servers 108. The example environment 100 can include many different content platforms 106, relay servers 108, client devices 102, and device trustworthiness servers 110.

A content platform 106 is a computing platform (such as, e.g., a network server or another data processing apparatus described with reference to FIG. 4) that enables distribution of content. Example content platforms 106 include search engines, social media platforms, new platforms, data aggregator platforms, or other content sharing platforms. Each content platform 106 may be operated by a content platform service provider.

The content platform 106 can publish and make available its own content. For example, the content platform 106 may be a news platform, which publishes its own news articles. The content platform 106 may also present content provided by one or more content providers 108 that are not part of the content platform 106. In the above example, the news platform may also present third party content provided by one or more content providers 108. As another example, the content platform 106 may be a data aggregator platform that does not publish its own content, but aggregates and presents third party content provided by different content providers 108.

In some implementations, a content platform 106 may store certain information about a client device (e.g., device preference information, content consumption information, etc.). Such user information may be used by the content platform, e.g., to tailor the content that is provided to the client device 102 or to enable ready access to particular content that is frequently accessed by the client device 102. In some implementations, the content platform 106 may not store such device information on the platform; however, the content platform 106 may nevertheless provide such information for storage on a particular server (separate from the content platform). The content platform 106 (also referred to herein as content platform/server 106 or simply server 106) thus refers to a content platform that stores such device information or a server (separate from the content platform) that stores such device information.

A device trustworthiness server 110 is a server (or another data processing apparatus as described with reference to FIG. 4) that determines whether a client device 102 is trustworthy. In some implementations, a client device 102 provides a set of signals (e.g., type of device used, operating system of the device, etc.), which are referred to in this specification as device trustworthiness data, to the device trustworthiness server 110. Based on the received device trustworthiness data, the device trustworthiness server 110 determines whether the client device is trustworthy. In some implementations (and as further described below with reference to FIGS. 2 and 3), the device trustworthiness server 110 provides the indication regarding whether the client device 102 is trustworthy to the client device 102.

A relay server 108 is a server (or another appropriate data processing apparatus, as described with reference to FIG. 4) that serves a relay between the client device and the various content platforms/servers 106 that store user information for the user associated with the client device 102. The relay server 108 validates requests to control user information received from the client devices 102 before transmitting such requests to each of the plurality of servers (as described with reference to FIGS. 2 and 3). In some implementations (and as further described below with reference to FIGS. 2 and 3), the relay server receives, from a client device 102, a single request to exercise user information stored at multiple content platforms/servers 106, validates this request, and if validated, transmits this request to the multiple content platforms/servers 106.

Additional structural and operational aspects of these components of the example environment 100 are described with reference to FIG. 2.

Figure 2:
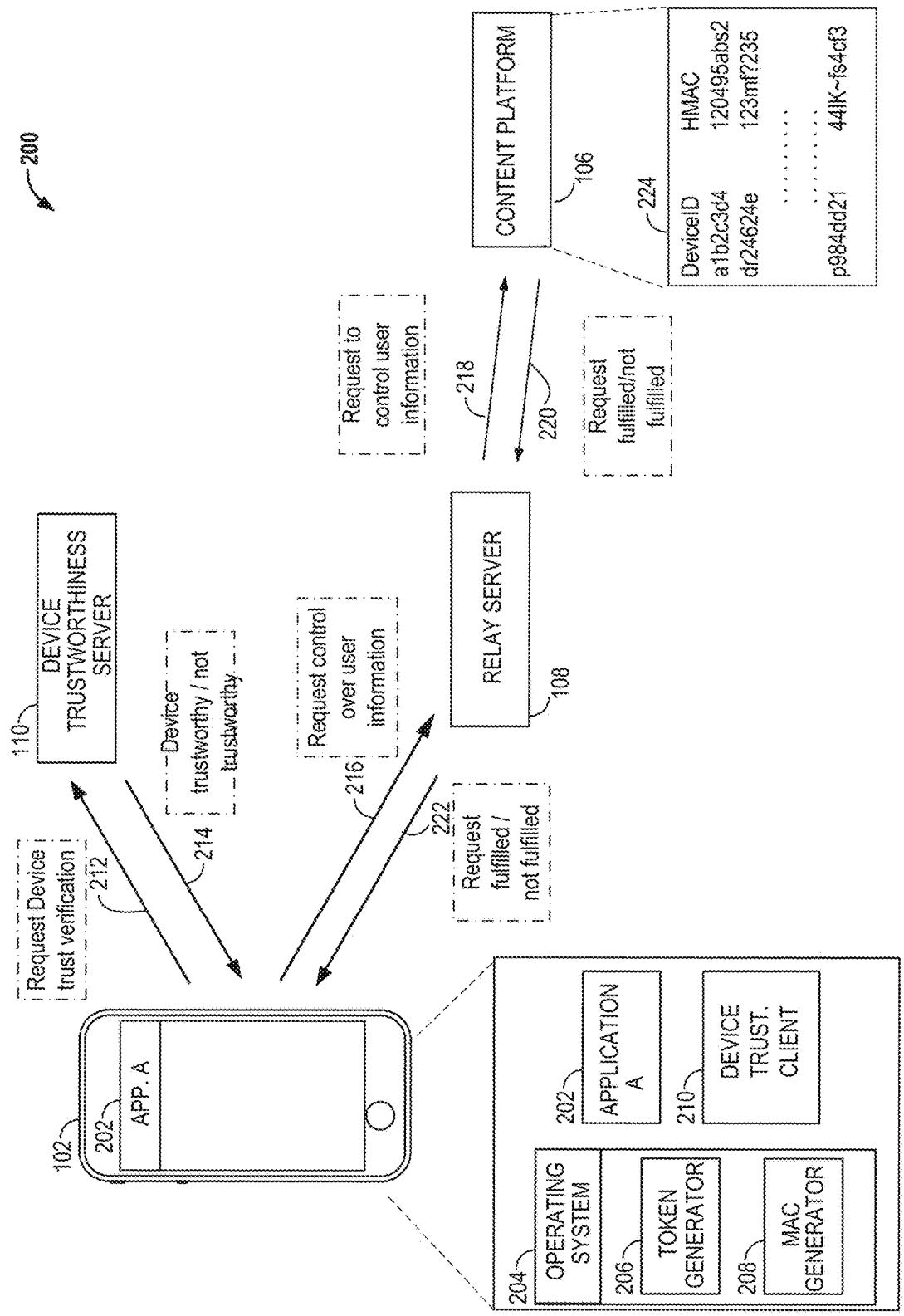
FIG. 2 is a block diagram of an example environment in which a client device's request to exercise control over user information stored on content platforms is received and processed.

FIG. 2 is a block diagram of an example environment 200 relating to the transmission and processing of a request to control user information from the client device 102 to multiple content platforms 106.

As shown in FIG. 2, the client device 102 includes an operating system 204, a device trustworthiness client 210, and an application A 202. The operating system 204 is generally responsible for managing the client device 102's hardware and software resources, e.g., such as application A 202. In some implementations, the operating system 204 includes a token generator 206 and a MAC generator 208, each of which is described below.

The token generator 206 generates a digital token using data and instructions for controlling user information stored at multiple content platforms/servers 106. In some implementations, the token generator 206 digitally signs the generated digital token using, e.g., the client device 102's private key.

In some implementation, the digitally signed token generated by the token generator 206 is an attestation token. As used in this specification, an attestation is a digital token that includes a set of data, which can include one or more of the following data items: (1) a unique identifier of the client device 102, (2) a timestamp (also referred to as a request timestamp) indicating the creation time of the token, (3) a payload including data indicating the request to exercise control over the user information, and (4) optionally, a device trustworthiness token previously generated by the device trustworthiness server 110 (i.e., the device trustworthiness token can be, but need not be, included in the attestation token). The attestation token also includes a digital signature that the token generator 206 generates by signing the set of data included in the attestation token using the client device 102's private key.

The following paragraphs describe each data item in the set of data and the digital signature of this set of data, as included in the attestation token.

The unique identifier of the client device 102 included in the attestation token can be or include a public key of the client device 102. For example, the client device 102 can generate and/or maintain one or more pairs of cryptographic keys including a device private key and a device public key. The device public key corresponds to, and is mathematically linked to, the device private key. Data that is digitally signed using a private key can only be verified using the corresponding public key. Similarly, data that is encrypted using the public key can only be decrypted using the corresponding private key. Alternatively, instead of the device's public key, another appropriate device identifier can be used, such as, e.g., the device's MAC address.

The timestamp included in the attestation token specifies/indicates the time when the attestation token was created. In some implementations, the timestamp specifies the time (and in some instance, the date) when the attestation token was created. In some implementations, the timestamp can record time at a high resolution (e.g., such that it can record the creation time in units of microseconds or even nanoseconds) or at a low resolution (e.g., such that the recorded creation time is in units of hours or minutes).

The payload included in the attestation token can include data indicating the request to control user information stored at one or multiple servers. This data can (1) specify the type of action that the user is requesting with respect to the data (e.g., delete data, modify access to data, prevent further transmission of data) and (2) specify the scope of the request—i.e., whether to perform the requested action at specific content platform(s)/server(s) 106 or at content platform(s)/server(s) with which a relay server 108 (that receives the request) communicates. If the scope of the request specifies the requested action at particular content platform(s)/server(s) 106, the payload can also include the domain address(es) or other types of identifiers of those platform(s)/server(s) 106.

The device trustworthiness token, which can be optionally included in the attestation token, enables an entity to determine whether an attestation token was sent by a trusted client device 102. The device trustworthiness token can be issued by a third-party device integrity system (such as device trustworthiness server 110) that evaluates a set of signals corresponding to a particular client device and assigns a level of trustworthiness (e.g., a numerical score within a range of scores, a binary determination of trustworthiness) to the client device 102 based on the evaluation.

In some implementations, the device trustworthiness token for a client device 102 can include (1) a verdict that indicates the level of trustworthiness (or integrity) of the client device 102 at the time that the device trustworthiness token was generated, (2) a device trustworthiness token creation time that indicates a time at which the device trustworthiness token was generated, and (3) a unique identifier for the client device 102 (which can be, e.g., the device public key of the client device or its derivative). The device trustworthiness token can also include a digital signature of the data in the device trustworthiness token. This digital signature can be generated using a private key of the device trustworthiness server 110.

For example, the device trustworthiness server 110 can sign the data using its private key, which the server 110 maintains confidentially. The entities that receive the device trustworthiness token can use a public key of the device trustworthiness server 110 to verify the signature of the device trustworthiness token. Moreover, including the device public key (or its derivative, e.g., a digital digest) for the client device 102 in both the device trustworthiness token and the attestation token binds these two tokens together. In other words, by including the device public key (or another appropriate device identifier) of the client device 102 in the device trustworthiness token, a recipient of the attestation token can determine that the device trustworthiness token was generated for that client device 102. This prevents, e.g., other parties from including a device trustworthiness token for a trusted device in falsified requests from an emulator or a compromised client device.

The digital signature included with the attestation token can be a digital signature of the above-described set of data (or some variant thereof). This digital signature is generated using the device's private key of the client device 102, which can be maintained securely and confidentially by the operating system 204 of the client device 102. In some implementations, the digital signature can be a digital signature of the payload, the device identifier (e.g., device public key), timestamp, and the device trustworthiness token. In some implementations, the operating system 118 generates the digital signature using an Elliptic Curve Digital Signature Algorithm (ECDSA), but other signature techniques can also be used, such as Rivest-Shamir-Adleman (RSA).

In some situations, another type of digitally signed token can be generated by the token generator 116, which also can be used to secure the communication of the request to control user information and any corresponding data. For example, in such implementations, the data can be digitally signed using a private key of the third party integrity system (such as device trustworthiness server 110). The entities that subsequently receive the digitally signed token can request the corresponding public key from the third party integrity system, and then use this key to verify the signature and the included data.

The MAC generator 208 generates a message authentication code (MAC) for different sets of data (as further described below and further with reference to FIG. 3). In some implementations, the MAC generator 208 uses a MAC algorithm (which is a type of a cryptographic pseudorandom function) to generate hash-based message authentication codes (HMACs), which are also referred to as keyed-hash message authentication codes. In such implementations, the MAC generator 208 generates an HMAC (e.g., using an HMAC Secure Hash Algorithm 256-bit variant (SHA256 algorithm)) for the different sets of data/parameters. In some implementations, instead of using the HMAC or another MAC algorithm, the MAC generator 208 use another appropriate cryptographic pseudorandom function (PRF) that uses the parameters that are otherwise used by the MAC generator 208 in generating the various digital digests, as described throughout this specification. For ease of reference, in the rest of this specification, the MAC generator 208 is described as generating MACs or HMACs; however, it will be appreciated that the same functions/computations described throughout this specification could alternatively be performed using another appropriate cryptographic PRF.

The MAC generator 208 generates the HMAC for a particular set of data using a secret cryptographic key of the operating system 118 (which is stored in a secure location within the client device). The MACs/HMACs generated by the system of FIG. 2 are further described below.

The client device 102 also includes a device trustworthiness client 210. In some implementations, the device trustworthiness client 210 is invoked by the operating system 204 and collects signals, alone or in cooperation with the operating system 204, from the client device 102's environment. Examples of the signals collected by the device trustworthiness client 110 include, but not limited to, the type of device, the model number of the device, evidence of whether the device has been rooted and/or jailbroken, the operating system running on the device, when the device was last updated, etc. Alternatively, instead of the device trustworthiness client 210, the operating system 204 alone can obtain the device trustworthiness data. These signals, which are collectively referred to as device trustworthiness data, can be used to determine a trustworthiness of the client device 102 by the device trustworthiness server 110 (as further described below and with reference to FIG. 3).

In some implementations, the client device 102 (e.g., via an application A 202) generates a request 212 to verify the trustworthiness of the client device 102. This request can include (1) device trustworthiness data—obtained by the device trustworthiness client 210, the operating system 204, or both—from which the trustworthiness of the client device is determined and (2) an digital digest of the encrypted attestation token and the request timestamp, which is also referred to as "third MAC" in this specification.

In some implementations, this digital digest of the encrypted attestation token and the request timestamp is generated using the MAC generator 208 operating alone or in conjunction with the operating system 204, as described in the following operations.

First, the MAC generator 208 generates a secret key by generating an HMAC using the current date and a data string (e.g., a phrase such as "encrypt") and then generating another HMAC using the HMAC of the current date and the data string as well as the unique identifier of the client device 102 (e.g., the device's public key). This operation can be represented using the following formulation:

HMAC (DeviceID, HMAC (current_date, "encrypt")

Alternatively, the above computation can be modified to interchange any of the parameters of this computation (DeviceID, current_date, "encrypt") to generate the secret key. For example, the MAC generator 208 can generate the secret key by generating an HMAC using the DeviceID and a data string (e.g., a phrase such as "encrypt") and then generating another HMAC using the HMAC of the DeviceID and the data string as well as the current_date. As another example, the MAC generator 208 can generate the secret key by generating an HMAC using the DeviceID and the current_date and then generating another HMAC using the HMAC of the DeviceID and the current_date, and the data string ("encrypt").

Alternatively, instead of the above computation, the MAC generator 208 can generate a secret key by computing a MAC as follows: MAC (Device||current_date||"encrypt"). In this example computation, | can be any reversible method to compose complex message from simple messages, e.g., protocol buffer, concise binary object representation (CBOR).

As another alternative, any other cryptographic pseudo-random function (other than MAC/HMAC) that uses three parameters can be used to generate the data item (5) in the set of data included in request 216.

By using the current date in generating the HMAC (and thus the resulting secret key), the secret key is ephemeral. In other words, the secret key can only be used to decrypt the attestation token on the current date (as will be further described below).

Second, the MAC generator 208 (or the operating system 204 generally) uses a symmetric probabilistic encryption algorithm to encrypt the attestation token using the generated secret key.

Third, the MAC generator 208 generates an HMAC using the encrypted attestation token and the timestamp of the creation of the attestation token, to obtain, e.g., a digital digest (which is also referred to as the third MAC) of the encrypted attestation token and the request timestamp specifying when the attestation token was created. This operation can be represented using the following formulation:

HMAC (encrypted_attestation_token, request_timestamp)

As described above, the digital digest of the encrypted attestation token and the request timestamp is the HMAC of the two parameters: encrypted attestation token and the request_timestamp. In some implementations, instead of generating this digital digest/third MAC, the encrypted attestation token alone can be included in the request 212. For the rest of this specification, it will be assumed that the digital digest of the encrypted attestation token and the request timestamp is included in the request 212. However, it will be appreciated that the below disclosure is equally applicable if the encrypted attestation token is included in the request 212.

Because of the use of the HMAC algorithm or another PRF algorithm (over the encrypted attestation token and the request timestamp), the device trustworthiness server 110 does not receive the encrypted attestation token, nor can the device trustworthiness server 110 infer the attestation token from the HMAC (or other PRF) over the encrypted attestation token and the request timestamp. As a result, the device trustworthiness server 110 cannot learn the nature of the client device 102's request to control user information (e.g., whether the device is requesting deletion/modification of all user information) or the scope of the request (e.g., whether the request is to be performed by particular content platform(s)/server(s) 106 or by a larger number of such servers/platforms 106).

Returning to FIG. 2, the client device 102 sends the request 212 to the device trustworthiness server 110. Upon receiving the request 212, the device trustworthiness server 110 uses the device trustworthiness data included in the request 212 to determine whether the device is trustworthy. If the device trustworthiness server 110 determines that the client device 102 is trustworthy, the device trustworthiness server 110 digitally signs the digital digest of the encrypted attestation token and the request timestamp with its private key. On the other hand, if the device trustworthiness server 110 determines that the client device 102 is not trustworthy, the device trustworthiness server does not digitally sign the digital digest of the encrypted attestation token and the request timestamp.

In some situations, instead of (or in addition to) indicating trustworthiness by digitally signing the digital digest of the encrypted attestation token and the request timestamp, the device trustworthiness server 110 can indicate the device's trustworthiness using a flag (e.g., a one-bit flag where 0 indicates not trustworthy and 1 indicates trustworthy) or other data (e.g., a data message where "TRUST" indicates that the device is trustworthy and "DON'T TRUST" indicates that the device is not trustworthy). For the rest of this specification, it will be assumed that the device trustworthiness server 110 indicates the device's trustworthiness by digitally signing the digital digest of the encrypted attestation token and the request timestamp.

The device trustworthiness server 110 sends a response 214 to the client device 102. This response includes the digital signature over the digital digest of the encrypted attestation token and the request timestamp (in the event that the device trustworthiness server 110 determines that the client device 102 is trustworthy) or an error code/empty response (in the event that the device trustworthiness server 110 determines that the client device 102 is not trustworthy or the device trustworthiness server 110 determines that the client device 102's trustworthiness cannot be verified).

Upon receiving the response 214 from the device trustworthiness server 210, the client device 102 sends a request 216 to the relay server 108, requesting control over user information stored at multiple content platforms/servers 106. In some implementations, when the client device 102 (e.g., the operating system 204) sends the request 216 to the relay server 108, this request 216 includes a set of data. This set of data can include one or more of the following data items: (1) the digitally-signed third MAC/digital digest of the encrypted attestation token (or other digital token) and the request timestamp; (2) the encrypted attestation token (or other digital token); (3) the timestamp indicating when the attestation token (or other digital token) was created; (4) the scope of the request, as specified in the payload of the attestation token (and as described above); or (5) an HMAC (or another appropriate PRF) over the device's unique identifier (e.g., the device's public key) and another HMAC over the current date and a data string (e.g., a phrase such as "challenge"). The HMAC in data item (5) can be represented using the following formulation:

HMAC (DeviceId, HMAC (current_date, "challenge"))

Alternatively, the above computation can be modified to interchange any of the parameters of this computation (DeviceID, current_date, "challenge") to generate the HMAC in data item 5. For example, the MAC generator 208 can generate this HMAC by generating an HMAC using the DeviceID and a data string ("challenge") and then generating another HMAC using the HMAC of the DeviceID and the data string as well as the current_date. As another example, the MAC generator 208 can generate the HMAC by generating an HMAC using the DeviceID and the current_date and then generating another HMAC using the HMAC of the DeviceID and the current_date, and the data string ("challenge").

Alternatively, instead of the above computation, the MAC generator 208 can generate a secret key by computing a MAC as follows: MAC (Device||current_date||"challenge"). In this example computation, ||can be any reversible method to compose complex message from simple messages, e.g., protocol buffer, concise binary object representation (CBOR).

As another alternative, any cryptographic pseudo random function that uses three parameters can be used to generate the data item (5) in the set of data included in request 216.

Upon receiving the request 216 and the set of data included therein, the relay server 108 determines whether the client device 102 was determined to be trustworthy by the device trustworthiness server 110. In some implementations, the relay server 108 uses the device trustworthiness server 110's public key to verify the digital signature created by the device trustworthiness server 110. If the digital signature is verified, the relay server 108 determines that the client device is trustworthy. On the other hand, if the digital signature is not verified, the relay server 108 determines that the client device 102 is not trustworthy. In some implementations, the relay server 108 further verifies the freshness of the request as indicated by the request timestamp (e.g., a request that is received within a certain threshold time after the time indicated by the request timestamp is deemed to be a fresh request). Furthermore, the relay server validates the request by recalculating the digital digest of the encrypted attestation token and the request timestamp, and matching the digital digest against the digital digest received in the request. A mismatch indicates that the request is invalid (which in turn may represent that the client device is not trustworthy).

If the relay server 108 determines that the client device 102 is not trustworthy, or the request is invalid, the relay server 108 does not transmit the request further to any of the content platforms/servers 106 with which it communicates. Thus, to the extent that the client device 102 is a malicious or compromised device attempting perpetrate attacks (e.g., DOS attacks) on the content platform(s)/server(s) with which the relay server 108 communicates, the relay server 108's (and the device trustworthiness server 110's) trustworthiness determination prevents such attacks. In some implementations, in addition to determining not to transmit any requests to the content platform(s)/server(s) 106, the relay server 108 can also send a message to the client device 102 indicating that the request 216 was not fulfilled.

On the other hand, if the relay server 108 determines that the client device 102 is trustworthy, the relay server 108 transmits a request 218 to the content platforms/servers 106 specified in the scope of the request included in the request 216. For example, if the scope of the request included in the request 216 specifies only a select number of domains corresponding to certain content platform(s)/server(s) 106, the relay server 108 transmits request 218 to each of those content platform(s)/server(s) 106. On the other hand, if the scope of the request included in the request 218 does not specify a select number of domains corresponding to certain content platform(s)/server(s) 106, the relay server 108 infers that the request is global and thus, transmits the request 218 to the various content platform(s)/server(s) 106 with which the relay server 108 communicates.

In some implementations, the request 218 can include a set of data. This set of data can include one or more of the following data items extracted from the request 216 (i.e., the request from the client device 102 to the relay server 108): (1) the digitally-signed digital digest of the encrypted attestation token (or other digitally signed token) and the request timestamp; (2) the encrypted attestation token (or other digital token); (3) the timestamp indicating when the attestation token (or other digital token) was created; and (4) an HMAC over the device's unique identifier (e.g., the device's public key) and another HMAC over the current date and the phrase (e.g., "challenge"). The HMAC operation of data item (4) can be represented using the following formulation:

HMAC (DeviceID, HMAC (current_date, "challenge"))

As described with reference to data item (5) in request 216, the above computation can be computed in alternative ways or can be computed using another cryptographic pseudorandom function other than HMAC.

Upon receiving the request 218, the content platform/server 106 can verify the digital signature of the device trustworthiness server 110 over the digital digest of the encrypted attestation token and the request timestamp (in the same manner as described above with reference to the relay server 108 verifying the signature).

If the digital signature is not verified, the content platform/server 106 does not process the request 218 any further and determines that the relay server 108 and/or the client device 102 has malfunctioned or is untrustworthy or compromised. In some implementations, the content platform/server 106 further verifies the freshness of the request as indicated by the request timestamp. Furthermore, the content platform/server validates the request by recalculating the digital digest of the encrypted attestation token and the request timestamp, and matching the digital digest against the digital digest received in the request, in the same manner as described above with reference to the relay server 108 verifying the signature. A mismatch indicates that the request is invalid.

On the other hand, if the digital signature and the request are verified (e.g., based on the same verification and digital digest comparison described above), the content platform/server 106 determines that the client device 102 is trustworthy. In such instances, the content platform/server 106 determines whether the content platform/server 106 includes user information corresponding to the client device 102's unique device identifier (e.g., the device's public key).

Note that, in implementations where the relay server 108 only provides the content platform/server 106 the digital digest of the encrypted attestation token and the request timestamp, the content platform/server 106 cannot access the device's unique identifier (e.g., the device's public key), which is included in the attestation token (or another digital token). In such implementations, the content platform/server 106 includes a storage device that stores a lookup table (or another appropriate data structure) maintaining a correlation between device unique identifiers (DeviceIDs) and HMAC values (or other digital digest values generated using another PRF), which are computed over the device's unique identifier and another HMAC over the current date and the data string phrase (e.g., a phrase such as "challenge") (i.e., using the same parameters and based on the same computation as described above with reference to request 218). In other words, the resulting HMAC computation is similar to the HMAC computation that was performed to obtain data item (4) in request 218 above:

HMAC (DeviceID, HMAC (current_date, "challenge")

As described above, the above computation can be computed in alternative ways or can be computed using another cryptographic pseudorandom function other than HMAC.

Because the "current_date" is used as a parameter in computing the HMAC value, the content platform/server 106 updates the computed HMAC values in lookup table 224 each day, using the current date of that day. Thus, if the relay server 108 sends a computed HMAC value that is computed using a date other than the current date, the HMAC will not be found in the lookup table and the content platform/server 106 will not perform any further processing on the received request 218.

In operation, content platform/server 106 compares the HMAC value received in the set of data included in request 218 with the HMAC values stored in the lookup table. If an exact match is not found, the content platform/server 106 determines that it cannot perform the request 218 to control user information. This scenario could occur, e.g., if the content platform/server 106 does not include user information for the particular device identifier, if the relay server 108 sends an incorrect HMAC or an outdated HMAC using a date other than the current date (indicating, e.g., that the relay server 108 has malfunctioned or has been compromised by a malicious entity), or the client device 102 sends an outdated or incorrect HMAC (indicating, e.g., that the client device 102 has malfunctioned or has been compromised by a malicious entity).

On the other hand, if an exact match is found based on the comparison between the HMAC value received in the set of data included in request 218 and an HMAC value stored in the lookup table 224, the content platform/server 106 retrieves the corresponding device identifier from the DeviceID field of the lookup table 224. Using the retrieved device identifier, the content platform/server 106 generates the secret key in the same manner that the client device generated the secret key prior to issuing request 212 (as described above). Specifically, the content platform/server 106 generates the secret key using the device identifier and an HMAC of the current date and the same data string (e.g., the phrase "encrypt") that was used to generate the secret key at the client device. The generation of the secret key by the content platform/server 106 can be represented using the following operation:

HMAC (DeviceID, HMAC (current_date, "encrypt")

As described above, the above computation can be computed in alternative ways or can be computed using another cryptographic pseudorandom function other than HMAC.

In this manner, the client device 102 and the content platform/server 106 do not need to exchange the secret key that will be used in the encryption/decryption of the attestation token. That is, as long as each uses the same parameters (e.g., current date, the same data string, and the DeviceID) and the same computation/formula/function, each can compute the same secret key. Moreover, this secret key is ephemeral in that the secret key is only valid for the current date. This ephemeral secret key is also for one single purpose. The single purpose ephemeral secret key is unlikely to be used as identifiers corresponding the client device's and/or any data corresponding to the device. In other words, the content platform/server 106 will not be able to decrypt the encrypted attestation token on the current date, if the secret key was not generated on the current date. In this manner, the content platform/server 106 can ensure that the request 218 (and the encrypted attestation token included therein) is fresh (current) and is not the subject of a reply attack, whereby an outdated (but valid) encrypted attestation token is provided to the content platform/server 106.

Using this generated secret key, the content platform/server 106 decrypts the encrypted attestation token that it received in the request 218 from the relay server 108. This results in obtaining the decrypted and plaintext attestation token.

The content platform/server 106 can further validate the attestation token by verifying the digital signature included in the attestation token. To verify the digital signature included in the attestation token, the content platform/server 106 uses the device's public key to validate the digital signature that protects the content of the attestation token (e.g., device identifier, request timestamp, request scope, and device trustworthiness token (when available)) with the corresponding data items included in the attestation token.

If the digital signature is invalid, the content platform/provider 106 determines that the attestation token is not valid (which may further indicate that the relay server 108 and/or the client device 102 malfunctioned or has been compromised). In this scenario, the content platform/server 106 ignores the request 218 and does not process it any further. In some implementations, the content platform/server 106 sends a response to the relay server 108 stating that the request 218 was not fulfilled.

On the other hand, if the digital signature is valid, the content platform/provider 106 determines that the attestation token is valid. In this scenario, the content platform/server 106 can perform a further validation to verify that the request to control information is to be fulfilled by the content platform/server 106. To perform this verification, the content platform/server 106 obtains the value for the scope of the request included in the attestation token (or other digital token). If the scope of the request identifies the particular content platform/server 106, this content platform/server 106 determines that it has to perform the request to control information as specified in the attestation token (or other digital token). Similarly, if scope of the request states that the request is global (i.e., it must be performed by the content platforms/servers 106 with which the relay server 108 communicates), the particular content platform/server 106 determines that it has to perform the request to control information as specified in the attestation token (or other digital token). On the other hand, if the request does not identify the particular content platform/server 106 and is not global, the content platform 106 determines that it does not need not to perform the requested action to control user information corresponding to the client device 102.

If the content platform/server 106 determines that it has to perform the request to control information, the content platform/server 106 obtains the type of action to be performed, as specified in the payload of the attestation token, and performs the appropriate action on the user information stored at the content platform 106 that corresponds to the client device 102.

For example, if the request specifies deleting all or part of the user information, the content platform/server 106 deletes all or part of the user information. As another example, if the request specifies modifying access to the user information to the client device 102, the content platform/server 106 adjusts the access settings for the user information and limits access to only those entities specified in the client device 102's request. As another example, if the request specifies preventing transmission of the user information to any entity other than the user of the client device 102, the content platform/server 106 adjusts the access settings for the user information and includes a specific control instruction along with the user information that prevents the content platform/server 106 from transmitting the user information to any entity other than the user.

After the content platform/server 106 performs the specified action (or after the content platform/server 106 determines that it does not need to fulfill the request), it provides a response 220 to the relay server 108, stating whether the request was fulfilled.

Upon receiving the response 220, the relay server 108 forwards this response 220 as part of response 222 to the client device 102. In some implementations, the relay server 108 consolidates the responses 220 from the various content platforms/servers 106 and provides a consolidated response 222 to the client device 102. In some implementations, the relay server 108 sends each of the responses 220 from the various content platforms/servers 106 as separate responses 222 to the client device 102 on an ad hoc basis—i.e., as and when these responses are received.

Thus, in view of the above description, the client device 102 does not need to send a separate request to control user information to multiple content platforms/servers 106. Rather, the client device 102 can send a single request 216 to the relay server 108, which transmits the request to the various content platforms/servers 106. In this manner, the computing resources (e.g., battery, network bandwidth) that would otherwise be consumed by the client device 102 when generating and transmitting multiple such requests (which can be in the hundreds of thousands or millions) are saved. Also, by verifying the device's trustworthiness and validating the requests received at the relay server 108, the above-described techniques prevent or at least reduce the likelihood of attacks (e.g. DoS attack) on relay servers being propagated to the various content platforms/servers 106. And, as further described above, all the communications to the relay server 108, the device trustworthiness server 110, and the content platforms/servers 106 shield the data included in these communications, which thus preserves the privacy of the device information included in these communications.

Figure 3:
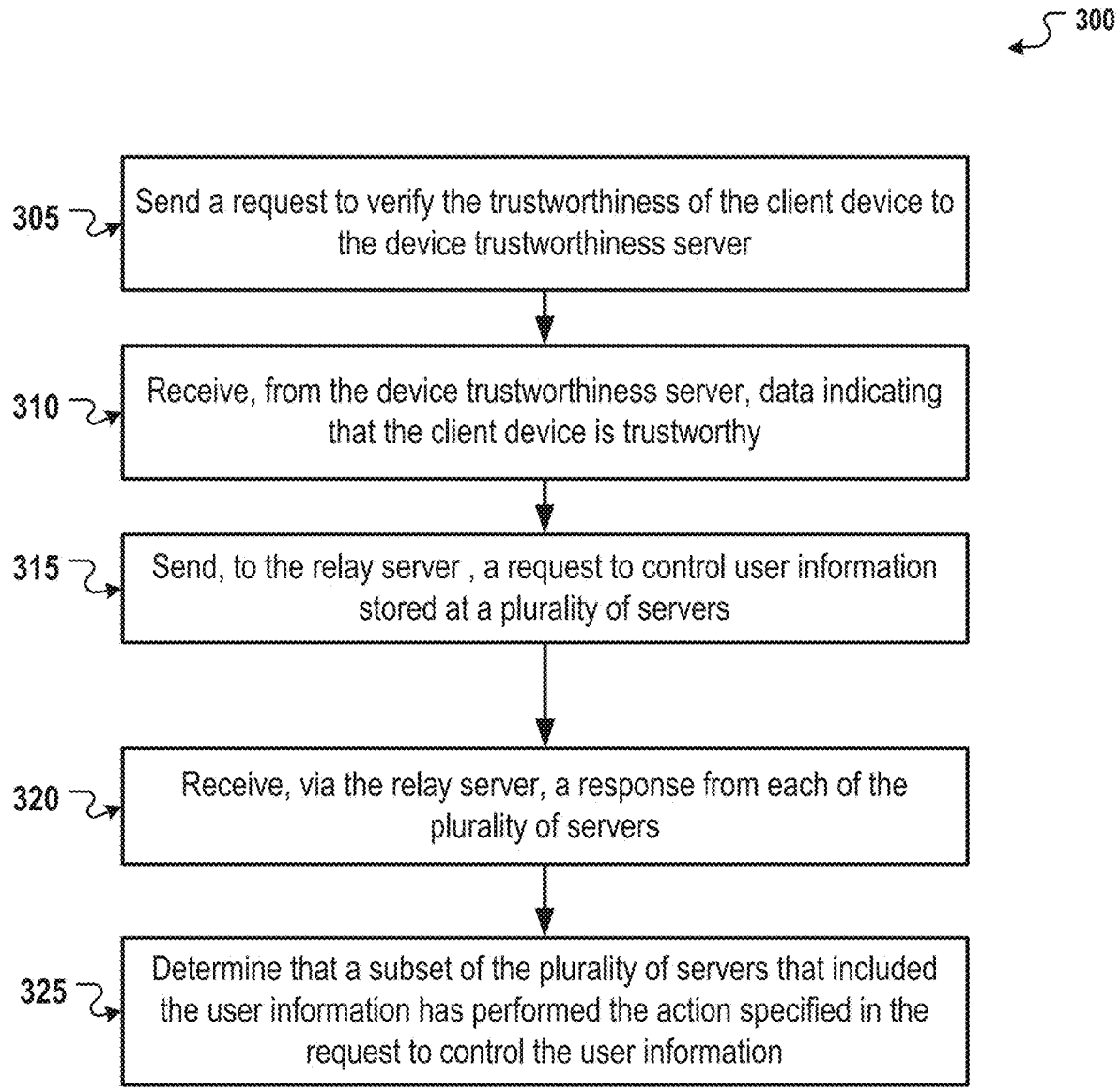
FIG. 3 is a flow diagram of an example process for generating and distributing variants of an audio digital component based on a template generated for the audio digital component.

FIG. 3 is a flow diagram of an example process 300 for transmitting and processing a request to control user information from the client device 102 to multiple servers. Operations of process 300 are described below as being performed by the components of the system described and depicted in FIGS. 1 and 2. Operations of the process 300 are described below for illustration purposes only. Operations of the process 300 can be performed by any appropriate device or system, e.g., any appropriate data processing apparatus. Operations of the process 300 can also be implemented as instructions stored on a computer readable medium which may be non-transitory. Execution of the instructions causes one or more data processing apparatus to perform operations of the process 300.

The client device 102 sends a request to verify the trustworthiness of the client device 102 to the device trustworthiness server 110 (at 305). In some implementations (and as described with reference to FIG. 2), the request to verify the trustworthiness of the client device includes a first set of data including (1) device trustworthiness data from which a trustworthiness of the client device is determined and (2) a third MAC generated using the encrypted digital token and the first data parameter, which can be the timestamp indicating a time at which a digital token was created (as described in the next paragraph): HMAC (encrypted_digital_token, request_timestamp).

In some implementations, the client device 102 generates the encrypted digital token using the following operations (as described above with reference to FIG. 2 and summarized below). First, the client device 102 generates a digital token. As described above with reference to FIG. 2, this digital token can be an attestation token that includes (1) a device identifier of the client device, (2) the first data parameter, which can be the timestamp specifying the time at which the digital token was created, (3) an instruction specifying a type of action to be taken with respect to user information (e.g., delete user information, prevent transmission of this information, modifying who can access this information, request disclosure of collected user information collected, request export of user information collected, or other requests with respect to user information) stored at a plurality of servers, and (4) data identifying the plurality of servers (e.g., a specific identification of the domain of the plurality of servers or a global instruction to send the request to the servers with which the relay server 108 communicates). In some implementations (and as described above with reference to FIG. 2), the attestation token can also include a device trustworthiness token that was previously generated by the device trustworthiness server and provided to the client device 102.

Second, the client device 102 uses an encryption key to encrypt the digital token using a symmetric encryption algorithm, to obtain an encrypted digital token. In some implementations, the symmetric encryption algorithm is probabilistic. In some implementations (and as described above with reference to FIG. 2), the client device 102 generates the encryption key by (1) computing a first MAC using the current date and a first data string (e.g., the phrase "encrypt"), and (2) generating a second MAC using the device identifier and the first MAC. The operation for generating the symmetric encryption key can be represented using the following formulation:

HMAC (DeviceID, HMAC (current_date, "encrypt"))

As described above with reference to FIG. 2, the above computation can be computed in alternative ways or can be computed using another cryptographic pseudorandom function other than HMAC.

Thus, in some implementations, the client device 102 sends the request to verify the trustworthiness of the client device 102 to the device trustworthiness server 110 and this request includes the first set of data as described above.

As described above with reference to FIG. 2, the MAC generator 208 of the client device 102 generates a message authentication code (MAC) for different sets of data. In some implementations, the MAC generator 208 uses a MAC algorithm (which is a type of a cryptographic pseudrandom function) to generate hash-based message authentication codes (HMACs), which are also referred to as keyed-hash message authentication codes. In such implementations, the MAC generator 208 generates an HMAC (e.g., using an HMAC SHA256 algorithm) for the different sets of data/parameters. In some implementations, instead of using the HMAC or another MAC algorithm, the MAC generator 208 use another appropriate cryptographic pseudorandom function (PRF) that uses the parameters that are otherwise used by the MAC generator 208 in generating the various digital digests described below. For ease of reference, for the rest of the description of the example process 300 of FIG. 3, it will be assumed that the MAC generator 208 of the client device 102 generates MACs or HMACs; however, it will be appreciated that the same functions/computations described below could alternatively be performed using another appropriate cryptographic PRF.

The device trustworthiness server 110 uses the device trustworthiness data included in the request to verify the device's trustworthiness, in determining whether the client device 102 is trustworthy. The device trustworthiness server 110 sends data indicating that the client device is trustworthy to the client device 102.

The client device 102 receives, from the device trustworthiness server, data indicating that the client device is trustworthy (at 310). In some implementations (and as described above with reference to FIG. 2), the device trustworthiness server 110 indicates that the client device 102 is trustworthy by digitally signing, using the private key of the device trustworthiness server 110, the third MAC value that the device generated using the encrypted digital token and the first data parameter. Because the third MAC is digitally signed by the device trustworthiness server 110, the client device 102 cannot modify the response from the device trustworthiness server 110. Alternatively, instead of indicating trustworthiness by digitally signing the third MAC, the device trustworthiness server 110 can indicate the device's trustworthiness using a flag (e.g., a one-bit flag where 0 indicates not trustworthy and 1 indicates trustworthy) or other data (e.g., a data message where "TRUST" indicates that the device is trustworthy and "DON'T TRUST" indicates that the device is not trustworthy). For the remainder of the process 300, it will be assumed that the device trustworthiness server 110 indicated the device's trustworthiness by digitally signing the third MAC.

In response to receiving the data indicating that the client device is trustworthy, the client device 102 sends, to the relay server 108, a request to control user information stored at a plurality of servers (at 315). The request to control user information specifies an action to be performed by the server with respect to the user information. For example, the action to be performed by the server can include: (1) deleting the user information stored at the server; (2) requesting that the user information stored at the server not be transmitted or provided to any other entity; (3) enabling access to the user information stored at the server to one or more entities; or (4) another appropriate action requested by the client device with respect to the user information stored at the server.

In some implementations, the request to control user information includes a second set of data including (1) the data indicating that the client device is trustworthy (as received from the device trustworthiness server 110 in operation 310), (2) the encrypted digital token previously generated by the client device 102, (3) the first data parameter included in the digital token, (4) data identifying the plurality of servers at which the appropriate action with respect to the user information is to be performed, and (5) a fourth MAC generated using the device identifier, a second data parameter (e.g., the current date), and a third data parameter, which can be a data string (e.g., the phrase "challenge"). The fourth MAC can be represented using the following formulation:

HMAC (DeviceID, HMAC (current_date, "challenge"))

As described above with reference to FIG. 2, the above computation can be computed in alternative ways or can be computed using another cryptographic pseudorandom function other than HMAC.

As described with reference to FIG. 2, upon receiving the request from the client device 102, the relay server 108 validates this request. In response to validating the request from the client device 102, the relay server 108 transmits the request to control user information to the various servers specified in the request from the client device 102 (as described with reference to FIG. 2).

As described with reference to FIG. 2, the server, upon receiving the request from the relay server 108, validates the request. If the server determines that the request is valid, the server performs the action specified in the request to control user information stored at the server (as described with reference to FIG. 2). On the other hand, if the server determines that the request is not valid, the server does not perform the action specified in the request to control user information stored at the server (as described with reference to FIG. 2). The server sends a response to the relay server 108, specifying whether the server fulfilled the request or did not fulfill the request (as described with reference to FIG. 2).

The client device 102 receives, via the relay server, a response from each of the plurality of servers (at 320). In some implementations, and as described above with reference to FIG. 2, the relay server, upon receiving the response from the various servers, transmits these responses to the client device 102. The client device 102 in turn receives these transmitted responses from the relay server 108 (as described with reference to FIG. 2).

Based on the responses received by the client device 102 at operation 320, the client device 102 determines that at least a subset of the plurality of servers that included the user information has performed the action specified in the request to control the user information (at 325). In some implementations, the client device 102 processes the received responses to determine whether the respective server fulfilled or did not fulfill the request. If the server responded that it fulfilled the requested, the client device 102 determines that that server stored the user information and that the server performed the action specified in the client device's request to control the user information in operation 315.

Thus, in this manner, the client device 102's request to control user information stored at multiple servers is generated and transmitted to the multiple servers storing this information, and is processed and fulfilled by these servers.

Figure 4:
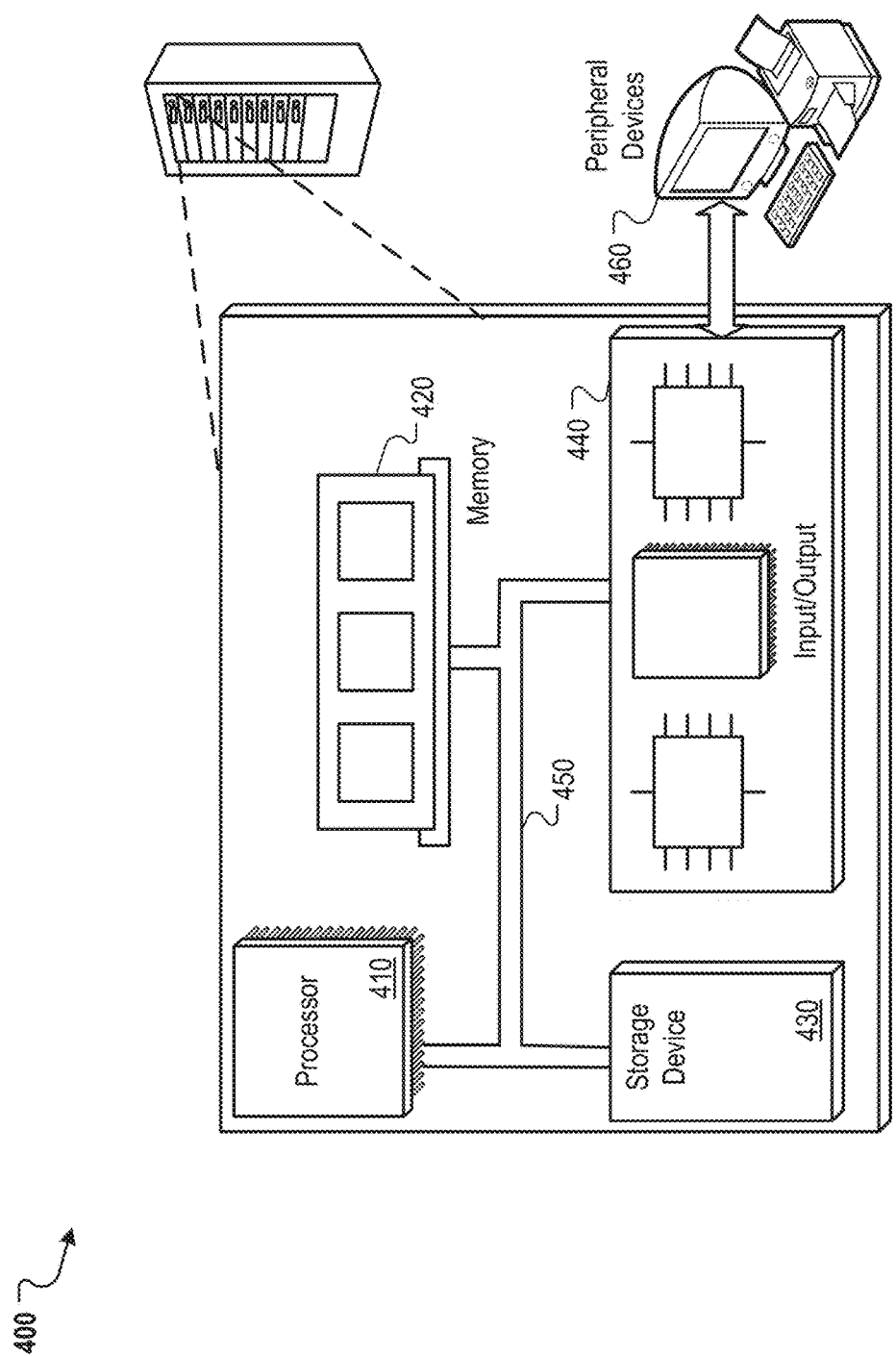
FIG. 4 is a block diagram of an example computer system that can be used to perform operations described.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and compact disk read only memory (CD-ROM) and digital versatile disk-read only memory (DVD-ROM) disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a hypertext markup language (HTML) page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer implemented method comprising:
generating, by a client device, a digital token comprising (1) a device identifier of the client device, (2) a first data parameter, wherein the first data parameter is a timestamp specifying a time at which the digital token was created, (3) an instruction specifying a type of action with respect to user data stored at a plurality of servers, and (4) data identifying the plurality of servers;
encrypting, by the client device, the digital token to obtain an encrypted digital token;
sending, by the client device and to a device trustworthiness server, a request to verify the trustworthiness of the client device, wherein the request comprises the encrypted digital token;
receiving, by the client device and from the device trustworthiness server, data indicating that the client device is trustworthy; and
in response to receiving the data indicating that the client device is trustworthy, controlling by the client device via a relay server, user data stored at a plurality of servers.

2. The computer implemented method of claim 1, wherein encrypting, by the client device comprises using a symmetric encryption algorithm, and wherein encrypting the digital token to obtain the encrypted digital token comprises:

generating an encryption key using a cryptographic pseudorandom function and based on data parameters comprising a current date, a first data string, and the device identifier; and encrypting, by the client device and using the encryption key, the digital token to obtain the encrypted digital token.

3. The computer implemented method of claim 2, wherein generating the encryption key using the cryptographic pseudorandom function and based on data parameters comprising a current date, a first data string, and the device identifier, comprises:

generating the encryption key by (1) computing a first message authentication code (MAC) using the current date and the first data string, and (2) generating a second MAC using the device identifier and the first MAC.

4. The computer implemented method of claim 1, wherein sending, by the client device and to a device trustworthiness server, the request comprises:

sending a first request to verify the trustworthiness of the client device, wherein the first request comprises a first set of data comprising (1) device trustworthiness data from which a trustworthiness of the client device is determined and (2) a third MAC generated using the encrypted digital token and the first data parameter; and sending a second request to control user data comprises a second set of data comprising (1) the data indicating that the client device is trustworthy, (2) the encrypted digital token, (3) the first data parameter, (4) data identifying the plurality of servers, and (5) a fourth MAC generated using the device identifier, a second data parameter, and a third data parameter.

5. The computer implemented method of claim 4, wherein the second data parameter comprises a current date and the third data parameter comprises a second data string.

6. The computer implemented method of claim 5, wherein receiving, by the client device and from the device trustworthiness server, the data indicating that the client device is trustworthy comprises:

receiving, by the client device and from the device trustworthiness server, a digital signature by the device trustworthiness server over the third MAC.

7. The computer implemented method of claim 1, wherein an action to be performed by the relay server with respect to the user data comprises one of:

deleting the user data stored at the relay server;

requesting that the user data stored at the relay server not be transmitted or provided to any other entity;

enabling access to the user data stored at the relay server to one or more entities;

requesting disclosure of user data collected; or requesting export of user data collected.

8. The computer implemented method of claim 1, wherein the relay server is a server that validates a request to control user data before transmitting the request to control user data to each of the plurality of servers and the request to control user data specifies an action to be performed by a server with respect to the user data.

9. A system, comprising:

one or more memory devices storing instructions; and one or more data processing apparatus that are configured to interact with the one or more memory devices, and upon execution of the instructions, perform operations comprising:

generating, by a client device, a digital token comprising (1) a device identifier of the client device, (2) a first data parameter, wherein the first data parameter is a timestamp specifying a time at which the digital token was created, (3) an instruction specifying a type of action with respect to user data stored at a plurality of servers, and (4) data identifying the plurality of servers;

encrypting, by the client device, the digital token to obtain an encrypted digital token;

sending, by the client device and to a device trustworthiness server, a request to verify the trustworthiness of the client device, wherein the request comprises the encrypted digital token;

receiving, by the client device and from the device trustworthiness server, data indicating that the client device is trustworthy; and in response to receiving the data indicating that the client device is trustworthy, controlling by the client device via a relay server, user data stored at a plurality of servers.

10. The system of claim 9, wherein encrypting, by the client device comprises using a symmetric encryption algorithm, and wherein encrypting the digital token to obtain the encrypted digital token comprises:

generating an encryption key using a cryptographic pseudorandom function and based on data parameters comprising a current date, a first data string, and the device identifier; and encrypting, by the client device and using the encryption key, the digital token to obtain the encrypted digital token.

11. The system of claim 10, wherein generating the encryption key using the cryptographic pseudorandom function and based on data parameters comprising a current date, a first data string, and the device identifier, comprises:

generating the encryption key by (1) computing a first message authentication code (MAC) using the current date and the first data string, and (2) generating a second MAC using the device identifier and the first MAC.

12. The system of claim 9, wherein sending, by the client device and to a device trustworthiness server, the request comprises:

sending a first request to verify the trustworthiness of the client device, wherein the first request comprises a first set of data comprising (1) device trustworthiness data from which a trustworthiness of the client device is determined and (2) a third MAC generated using the encrypted digital token and the first data parameter; and sending a second request to control user data comprises a second set of data comprising (1) the data indicating that the client device is trustworthy, (2) the encrypted digital token, (3) the first data parameter, (4) data identifying the plurality of servers, and (5) a fourth MAC generated using the device identifier, a second data parameter, and a third data parameter.

13. The system of claim 12, wherein the second data parameter comprises a current date and the third data parameter comprises a second data string.

14. The system of claim 13, wherein receiving, by the client device and from the device trustworthiness server, the data indicating that the client device is trustworthy comprises:

receiving, by the client device and from the device trustworthiness server, a digital signature by the device trustworthiness server over the third MAC.

15. The system of claim 9, wherein an action to be performed by the relay server with respect to the user data comprises one of:
- deleting the user data stored at the relay server;
- requesting that the user data stored at the relay server not be transmitted or provided to any other entity;
- enabling access to the user data stored at the relay server to one or more entities;
- requesting disclosure of user data collected; or
- requesting export of user data collected.

16. The system of claim 9, wherein the relay server is a server that validates a request to control user data before transmitting the request to control user data to each of the plurality of servers and the request to control user data specifies an action to be performed by a server with respect to the user data.

17. A non-transitory computer readable medium storing instructions that, when executed by one or more data processing apparatus, cause the one or more data processing apparatus to perform operations comprising:
- generating, by a client device, a digital token comprising (1) a device identifier of the client device, (2) a first data parameter, wherein the first data parameter is a timestamp specifying a time at which the digital token was created, (3) an instruction specifying a type of action with respect to user data stored at a plurality of servers, and (4) data identifying the plurality of servers;
- encrypting, by the client device, the digital token to obtain an encrypted digital token;
- sending, by the client device and to a device trustworthiness server, a request to verify the trustworthiness of the client device, wherein the request comprises the encrypted digital token;
- receiving, by the client device and from the device trustworthiness server, data indicating that the client device is trustworthy; and
- in response to receiving the data indicating that the client device is trustworthy, controlling by the client device via a relay server, user data stored at a plurality of servers.

18. The non-transitory computer readable medium of claim 17, wherein encrypting, by the client device comprises using a symmetric encryption algorithm, and wherein encrypting the digital token to obtain the encrypted digital token comprises:
- generating an encryption key using a cryptographic pseudorandom function and based on data parameters comprising a current date, a first data string, and the device identifier; and
- encrypting, by the client device and using the encryption key, the digital token to obtain the encrypted digital token.

19. The non-transitory computer readable medium of claim 18, wherein generating the encryption key using the cryptographic pseudorandom function and based on data parameters comprising a current date, a first data string, and the device identifier, comprises:
- generating the encryption key by (1) computing a first message authentication code (MAC) using the current date and the first data string, and (2) generating a second MAC using the device identifier and the first MAC.

20. The non-transitory computer readable medium of claim 19, wherein sending, by the client device and to a device trustworthiness server, the request comprises:
- sending a first request to verify the trustworthiness of the client device, wherein the first request comprises a first set of data comprising (1) device trustworthiness data from which a trustworthiness of the client device is determined and (2) a third MAC generated using the encrypted digital token and the first data parameter; and
- sending a second request to control user data comprises a second set of data comprising (1) the data indicating that the client device is trustworthy, (2) the encrypted digital token, (3) the first data parameter, (4) data identifying the plurality of servers, and (5) a fourth MAC generated using the device identifier, a second data parameter, and a third data parameter.

* * * * *